United States Patent [19]

Miloslavsky

[11] Patent Number: 5,825,870
[45] Date of Patent: *Oct. 20, 1998

[54] METHODS AND APPARATUS FOR IMPLEMENTING A NETWORK CALL CENTER

[75] Inventor: Alec Miloslavsky, San Carlos, Calif.

[73] Assignee: Genesys Telecommunications Laboratories, San Francisco, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 677,204

[22] Filed: Jul. 9, 1996

Related U.S. Application Data

[63] Continuation-in-part of Ser. No. 628,837, Apr. 5, 1996.

[51] Int. Cl.⁶ .................................................... H04M 3/58
[52] U.S. Cl. .......................... 379/265; 379/309; 379/207; 379/220
[58] Field of Search .................................... 379/265, 266, 379/309, 207, 201, 210, 220

[56] References Cited

U.S. PATENT DOCUMENTS

| | | |
|---|---|---|
| 4,290,141 | 9/1981 | Anderson et al. ........................ 455/2 |
| 4,320,256 | 3/1982 | Freeman . |
| 4,345,315 | 8/1982 | Cadotte et al. ......................... 364/900 |
| 4,355,207 | 10/1982 | Curtin . |
| 4,355,372 | 10/1982 | Johnson et al. ........................ 364/900 |
| 4,439,636 | 3/1984 | Newkirk et al. . |
| 4,451,700 | 5/1984 | Kempner et al. . |
| 4,489,438 | 12/1984 | Hughes ..................................... 381/51 |
| 4,517,410 | 5/1985 | Williams et al. . |
| 4,521,643 | 6/1985 | Dupuis et al. . |
| 4,523,055 | 6/1985 | Hohl et al. . |
| 4,528,643 | 7/1985 | Freeny, Jr. ............................... 364/900 |
| 4,539,435 | 9/1985 | Eckmann . |
| 4,559,415 | 12/1985 | Bernard et al. . |
| 4,566,030 | 1/1986 | Nickerson et al. ...................... 358/84 |
| 4,577,062 | 3/1986 | Hilleary et al. . |
| 4,577,067 | 3/1986 | Levy et al. . |
| 4,578,700 | 3/1986 | Roberts ..................................... 358/84 |
| 4,580,012 | 4/1986 | Matthews et al. . |
| 4,584,602 | 4/1986 | Nakagawa ................................ 358/84 |
| 4,587,379 | 5/1986 | Masuda . |
| 4,598,367 | 7/1986 | DeFrancesco et al. ................ 364/408 |
| 4,603,232 | 7/1986 | Kurland . |
| 4,611,094 | 9/1986 | Asmuth et al. . |
| 4,625,276 | 11/1986 | Benton et al. .......................... 364/408 |
| 4,630,200 | 12/1986 | Ohmae et al. .......................... 364/405 |
| 4,630,201 | 12/1986 | White ..................................... 364/408 |
| 4,634,809 | 1/1987 | Paulsson et al. ......................... 379/91 |
| 4,649,563 | 3/1987 | Riskin ..................................... 379/97 |
| 4,654,482 | 3/1987 | DeAngelis ............................... 379/95 |
| 4,667,287 | 5/1987 | Allen et al. ............................. 364/200 |
| 4,674,044 | 6/1987 | Kalmus et al. ......................... 364/408 |
| 4,696,029 | 9/1987 | Cohen ..................................... 379/92 |
| 4,697,282 | 9/1987 | Winter et al. ............................. 379/67 |
| 4,756,020 | 7/1988 | Fodale .................................... 379/112 |
| 4,757,267 | 7/1988 | Riskin .................................... 379/113 |
| 4,763,191 | 8/1988 | Gordon et al. ........................... 358/86 |
| 4,785,408 | 11/1988 | Britton et al. ....................... 364/513.5 |
| 4,788,715 | 11/1988 | Lee ........................................... 379/84 |

(List continued on next page.)

*Primary Examiner*—Ahmad F. Matar
*Attorney, Agent, or Firm*—Donald R. Boys

[57] ABSTRACT

A network call center hosted by a network service provider has equipment and software for providing call center services to customers of the network service provider. In a preferred embodiment internal connection points in a telephony switching apparatus at the network call center are provided and assigned to agents of customer call centers. The connection points are characterized in that a remote agent, dialing one of the connection points, is connected to the network call center until the agent intentionally disconnects. The network center tracks remote agents by the fact of connection, and provides call center services to groups of agents associated with the remote call centers. Different services may be provided to different remote call centers, and the network center tracks activities and bills the local call centers.

15 Claims, 2 Drawing Sheets

U.S. PATENT DOCUMENTS

| | | | |
|---|---|---|---|
| 4,812,843 | 3/1989 | Champion, III et al. | 340/905 |
| 4,866,756 | 9/1989 | Crane et al. | 379/88 |
| 4,893,328 | 1/1990 | Peacock | 379/67 |
| 4,896,345 | 1/1990 | Thorne | 379/67 |
| 4,908,850 | 3/1990 | Masson et al. | 379/88 |
| 4,953,204 | 8/1990 | Cuschleg, Jr. et al. | 379/266 |
| 4,972,461 | 11/1990 | Brown et al. | 379/67 |
| 5,001,710 | 3/1991 | Gawrys et al. | 370/110.1 |
| 5,017,917 | 5/1991 | Fisher et al. | 340/825.79 |
| 5,036,535 | 7/1991 | Gechter et al. | 379/210 |
| 5,073,890 | 12/1991 | Danielsen | 379/265 |
| 5,164,983 | 11/1992 | Brown et al. | 379/265 |
| 5,181,239 | 1/1993 | Jolissaint | 379/265 |
| 5,256,863 | 10/1993 | Ferguson et al. | 235/383 |
| 5,261,096 | 11/1993 | Howarth | 395/650 |
| 5,271,058 | 12/1993 | Andrews et al. | 379/210 |
| 5,274,700 | 12/1993 | Gechter et al. | 379/210 |
| 5,278,977 | 1/1994 | Spencer et al. | 395/575 |
| 5,280,625 | 1/1994 | Howarter et al. | 395/200 |
| 5,299,260 | 3/1994 | Shaio | 379/210 |
| 5,343,477 | 8/1994 | Yamada | 371/8.2 |
| 5,392,400 | 2/1995 | Berkowitz et al. | 395/200 |
| 5,444,774 | 8/1995 | Friedes | 379/266 |
| 5,455,903 | 10/1995 | Jollissaint et al. | 395/155 |
| 5,459,780 | 10/1995 | Sand | 379/210 |
| 5,467,391 | 11/1995 | Danaghue, Jr. et al. | 379/265 |
| 5,469,504 | 11/1995 | Blaha | 379/265 |
| 5,500,891 | 3/1996 | Harrington et al. | 379/265 |
| 5,528,678 | 6/1996 | Kaplan | 379/201 |
| 5,530,744 | 6/1996 | Charalambous et al. | 379/265 |

## METHODS AND APPARATUS FOR IMPLEMENTING A NETWORK CALL CENTER

FIELD OF THE INVENTION

This is a continuation-in-part of patent application Ser. No. 08/628,837 filed Apr. 5, 1996 entitled "Methods and Apparatus for Implementing an Outbound Network Call Center." This invention relates to telephone communications, and particularly relates to methods and devices for allowing network service providers to provide call center services to their customers.

BACKGROUND OF THE INVENTION

Telephone is one of the most widely used communication equipments in the world. At first, it was merely a convenient tool to allow people to communicate while they are physically separated. Recently, many companies use telephones to market products and services, provide technical supports to consumer products, allow callers to access their own financial data, etc. Thus, telephone is becoming a major business and marketing tool.

In order to more effectively use telephone for business and marketing purposes, call centers have been developed. In a call center, a large number of agents handle telephone communication with callers. The matching of calls between callers and agents is typically performed by software. A simple example is used here to describe a few of the many advantages of using call centers. When a call is made to a call center, the telephone number of the calling line is typically made available to the call center by a telephone carrier. Based on this telephone number, the software in the call center can access a database server to obtain information about the caller who has been assigned that phone number. The software can now route the call to an agent who can best handle the call based on predefined criteria (e.g., language skill, knowledge of products the caller bought, etc.). The software immediately transfers relevant information to a computer screen used by the agent. Thus, the agent can gain valuable information about the caller prior to receiving the call. As a result, the agent can more effectively handle the telephone transaction.

It can be seen from the above example that the enabling technology requires a combination of telephone switching and computer information processing technologies. The term commonly used for this combined technology is computer-telephony-integration (CTI).

In prior art arrangements, all the agents and CTI equipments are located in or close to the call center. Recently, some telephone carriers (such as local and long distance telephone companies) would like to provide call center services to their subscribers, which are scattered around many locations. Up to this point, it is not possible for the telephone carrier to provide call center services to subscribers in an efficient manner. Thus, these subscribers have to set up their own call centers. However, many small companies do not have the money or expertise to install and maintain these complicated hardware and software. Even though they may ask computer consultants to assist them, the response time of these consultants to fix problems is generally slow. On the other hand, it is critical that the down time of a call center be low because the labor costs of agents and the costs of lost goodwill from frustrated callers are high. Consequently, these small companies are not eager to use call center technology.

SUMMARY OF THE INVENTION

The present invention allows almost all the components in a call center system to be operated and maintained by a telephone network service provider (such as a telephone company) while the agents can be remotely located at the premises of the customers of the provider. Because the same service can be provided to many customers, the service provider can buy the most reliable equipments and employ full-time technicians to maintain the equipments. As a result, the customers of the service do not have to install, operate and maintain the hardware and software of a call center while at the same time receive reliable and state-of-the-art services. Consequently, it would be possible for many small companies to take advantages of the call center technology.

The present invention comprises a network switch which contains means for maintaining a continuous telephone communication between the network service provider and its customers. The network switch is located at the premise of the telephone network service provider. This means is present in some network switches manufactured by a number of manufacturers. Thus, an agent in a customer site (which could be far from the premise of the service provider) can call a specific telephone number to reach this means, and the agent is connected to the network switch as long as the call is not disconnected by the agent. For those network switches that do not contain such means, a looped around circuit can be formed by physically connecting a pair of station trunks (located in the network switch) together. This arrangement allows an incoming call (originated by an agent in the premise of a customer) that terminated at one of the station trunks to be continuously connected to the network switch, as long as the call is not disconnected by the caller (i.e., agent) who initiated the call. During the time the incoming call from the agent is connected to the station trunk or the means for maintaining continuous communication, the network switch can communicate with the originating agent at any time without the need to reestablish the telephone connection.

The present invention also comprises a computer telephony system which performs routing functions. It can route inbound and outbound calls of the network switch to appropriate agents in the customer's premise. This computer telephony system is preferably located at the premise of the network service provider.

In the preferred embodiment, the network switch and the computer telephony system are located at the premise of the network service provider. Thus, all the information and operations are centrally located. One advantageous feature of placing the components in one site is that all call center operation can be centralized. Thus, all data relating to call center activities and users (e.g., agents, customers, callers, etc.) can be maintained in a central database. The routing can be performed efficiently because all available agents can be selected based on the best available information.

As pointed out above, the network service provider and agents in the customer's premise can be in continuous telephone communication after the agents called the station trunk or means for maintaining continuous telephone communication. Thus, the call routed by the computer telephony system (in the provider's premise) can be connected to the customer's premise without the need to establish a new telephone connection. Consequently, the routing can be performed almost instantaneously.

These and other features of the present invention will become apparent from the following description when read in conjunction with the accompanying drawings and the appended claims.

DETAILED DESCRIPTION OF THE INVENTION

The present invention comprises a novel call center architecture and related methods. The following description is presented to enable any person skilled in the art to make and use the invention. Description of specific applications is provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
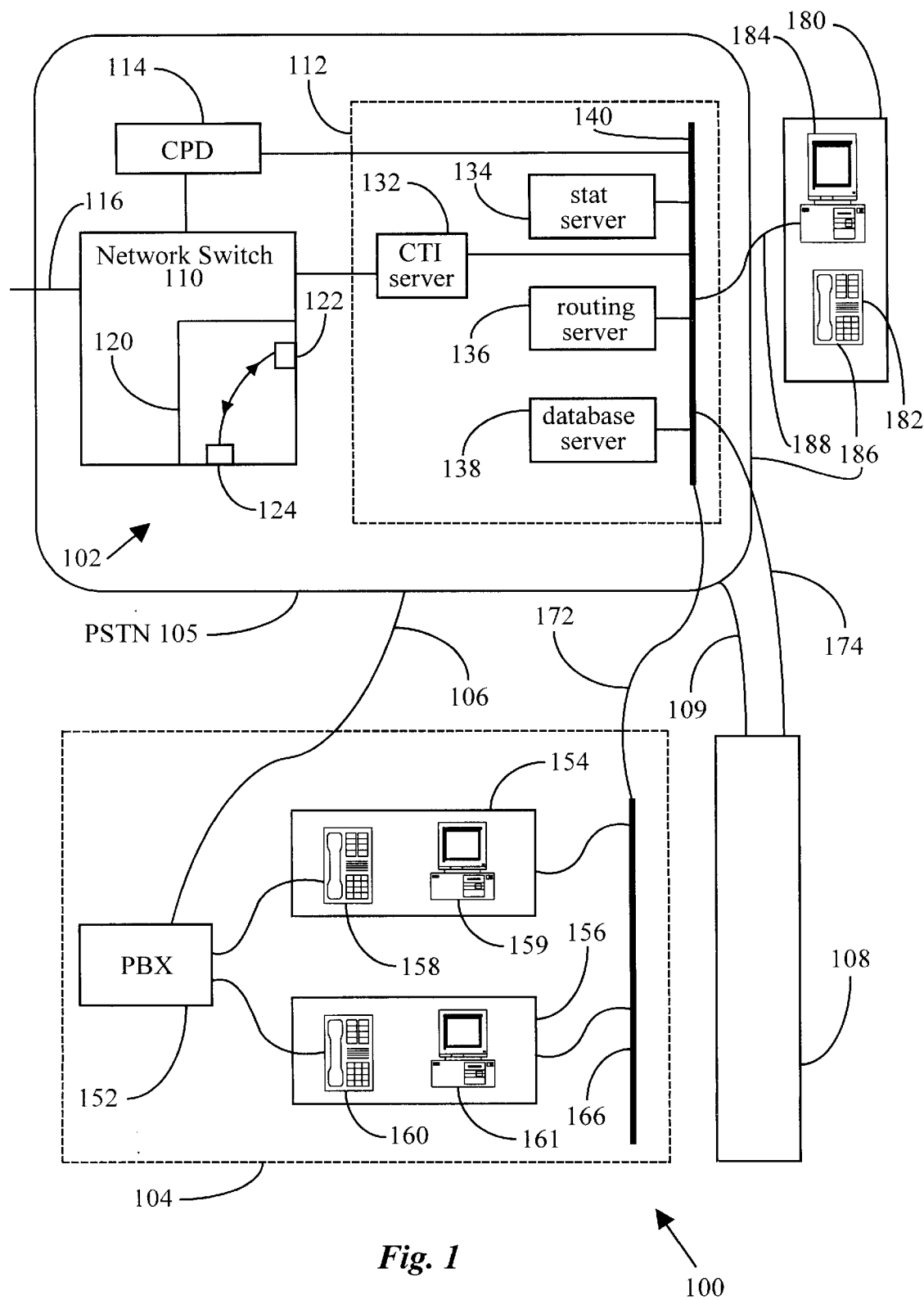
FIG. 1 is a drawing showing a call center architecture of the present invention.

FIG. 1 is a drawing showing a call center architecture 100 of the present invention. Architecture 100 contains a network provider call center 102 and a customer call center 104. Network provider call center 102 is maintained by an operator of a public-switched telephone network (PSTN) 105. Customer call center 104 is linked to PSTN 105 by a telephone link 106. Customer call center 104 is also optionally linked to provider call center 102 by a data connector 172. In this architecture, most of the equipments associated with the implementation of a call center are preferably located at provider call center 102 while the agents are preferably located at customer call center 104.

Network provider call center 102 provides call center services to other customers, such as customer call center 108. These call centers are linked to PSTN 105 by telephone links. For example, customer call center 108 is linked to PSTN 105 by telephone link 109. Further, customer call center 108 is optionally connected to provider call center 102 by a data connector 174.

In order to illustrate the operation of the present invention, the system in FIG. 1 is used to perform predictive dialing. In this case, agents in customer call center 104 want to contact potential buyers of a product or service. The telephone numbers of these potential buyers are stored in a database in provider call center 102. Equipments in provider call center 102 dial these telephone numbers. If a telephone number is busy, another telephone number is dialed automatically. When a potential buyer answers the call, the call is immediately routed to an available agent in customer call center 104. The agent can then talk to the buyer regarding the product or service.

Customer call center 104 comprises a private branch exchange and/or automatic call distributor (shown in FIG. 1 as PBX 152) and a plurality of stations, such as stations 154 and 156. Each station has a telephone (such as telephones 158 and 160 in stations 154 and 156, respectively) and a computer (such as computers 159 and 161). The telephones are connected to PBX 152. The computers are connected to a local area network 166, which is in turn connected to data connector 172. Agents in customer call center 104 are assigned to these stations to operate the telephones provided therein.

Provider call center 102 comprises a network switch 110, a CTI system 112 and a computer predictive dialer 114. Network switch 110 contains circuits that can provide switching and call distribution functions. Network switch 110 is coupled to a high bandwidth telephone line 116 so that a plurality of telephone channels are available for connecting to the telephones of potential buyers. Network switch 110 also contains means for keeping an incoming call connected thereto continuously so that this incoming call can be routed at will to any lines controlled by network switch 110 (referred herein as the "continuous connection" function). Network switches made by some manufacturers contain this means. For those network switches that do not contain this means, a "looped around" circuit 120 can be used to provide the same continuous connection functionality. Looped around circuit 120 comprises a pair of station trunks 122 and 124 in a network switch that are physically connected together. This arrangement allows an incoming call (originated from an agent in a customer call center) terminated at one of the station trunks, such as station trunk 122, to be continuously connected to network switch 110, as long as the call is not disconnected by the caller (i.e., the agent) who initiated the call. The means for keeping incoming calls connected and the looped around circuit are collectively called the "continuous connection means." During the time the incoming call is connected to continuous connection means, network switch 110 can communicate with the caller (i.e., the agent) at any time without the need to reestablish the telephone connection.

FIG. 1 shows the structure of CTI system 112. It contains a CTI-server 132, a stat-server 134, a routing server 136 and a database server 138. Stat-server 134 contains a database for storing all relevant activities of CTI system 112 (e.g., the current status and history of all calls in CTI system 112). Database server 138 contains information of customer call center 104, such as information on various agents who work in customer call center 104. Routing server 136 routes calls to appropriate stations in customer call center 104 based on factors such as the information contained in stat-server 134 and the status of various stations in customer call center 104. CTI-server 132, stat-server 134, routing server 136 and database server 138 are connected by a data communication network 140. Data connectors 172 and 174 connect data communication network 140 to the local area networks in customer call centers 104 and 108, respectively (such as local area network 166 in center 104).

CTI server 132 acts as a bridge between network switch 110 at one end and stat-server 134 and routing server 136 at the other end. CTI server 132 is designed to interface with network switches manufactured by different vendors and present a uniform application program interface (API) to stat-server 134 and routing server 136. An advantage of this arrangement is that individual components in provider call station 102 could be replaced and enhanced separately. For example, substantially the same routing server and stat-server could be used with network switches from different manufacturers (e.g., AT&T, Northern Telecom or Ericsson) by changing CTI server 132. Specifically, different versions of a particular implementation of CTI server 132 can be designed to match with switches made by different manufacturers (provided that the switches have a CTI link). These versions communicate with the same routing server, database server and stat-server through a standard protocol which is switch-independent.

In operation, when an agent begins work at one of the stations in customer call center 104, such as station 154, he dials a predetermined telephone number which terminates at network switch 110. When network switch 110 receives this call, it connect the call to the continuous connection means. For the network switches that contains loop around circuit 120, the call is connected to station trunk 122. As a result, telephone 158 in station 154 is connected to network switch 110 until the agent terminates the call. The agent can also send his identification number and other information to routing server 136 using telephone 158 or computer 159. At this time, CTI system 112 knows that station 154 is now in operation and the identity of the agent in station 154. CTI system 112 can route calls to this station. Other agents can log on to the system using the same method.

In order to illustrate an application of the present invention, predictive dialing using call center architecture 100 is described. When predictive dialing starts, CPD 114 causes network switch 110 to dial telephone numbers from its list. CPD 114 can be a software comprising a list manager (for managing a list of phone numbers to be dialed) and a dialer application. CPD 114 is connected to data communication network 140. When a connection to a potential buyer is established, network switch 110 passes this information to CTI system 112, which routes the call to one of the agents in customer call center 104. Because telephone connections between provider call center 102 and the agents have previously been established, network switch 110 can immediately connect the call to the selected agent. As a result, there is little delay in establishing communication between the agent and the buyer.

An important advantage of the present invention is that all call center features are centralized. As pointed out above, database server 138 and stat-server 134 contains information of the activities, users and agents of the call center. This information will be centrally available. Routing server 136 can centrally control the operation of the entire system (which includes provider call center 102 and all the customer call centers) and route calls to the most qualified agent to service a call.

Figure 2:
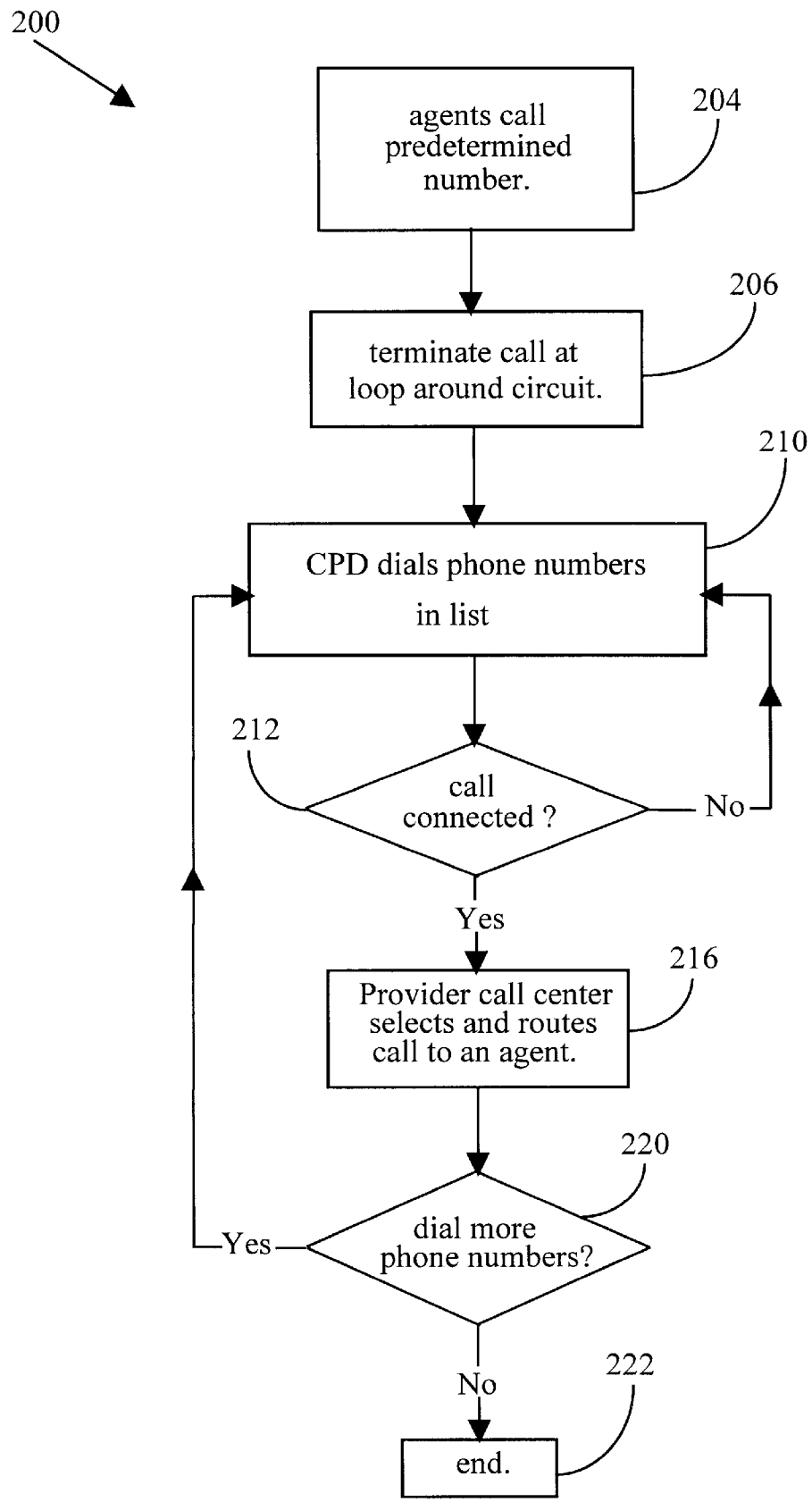
FIG. 2 is a flow chart showing an embodiment of the present invention.

FIG. 2 is a flow chart 200 showing the operation of the system shown in FIG. 1. In step 204, the agents in customer call center 104 call the predetermined number to provider call center 102. In step 206, the call terminates at the means for continuously connecting an incoming call (such as loop around circuit 120). At step 210, CPD 114 dials phone numbers in a list. It determines whether a call is connected (step 212). If the answer is negative (i.e., the call not connected), flow chart 200 branches back to step 210 and another phone number from the list is selected for dialing. If the answer is positive, the software in provider call center 102 selects an appropriate agent to take the call. The call is routed to the selected agent (step 216). CPD 114 determines whether other phone numbers in the list need to be called (step 220). If more numbers need to be called, flow chart 250 branches back to step 210, and the phone numbers are dialed. If no more phone numbers in the list needs to be called, flow chart 200 terminates (step 222).

It should be appreciated that the above described operation can be applied to other customer call centers. Also, other services, in addition to predictive dialing, can also be performed by network provider call center 102. For example, the present invention can also be used by provider call center 102 to process all inbound calls of the customer call centers. In this situation, the delay in establishing communication between agents and callers may not be an overly important problem. However, the ability to centralized information and operation remain an important advantage of the present invention over the prior art.

It should also be appreciated that even though CTI server 132, routing server 136, stat-server 134 and database server 138 are shown as separate components, they could be combined into one, two or three components residing on one or more data processing devices. In one embodiment of the present invention, they are implemented as a client/server architecture, and they can be geographically separated.

In addition to customer call centers, individual stations can also use the service of the network call center. As an example, FIG. 1 shows a station 180 having a telephone 182 and a computer 184. Phone 182 is connected to PSTN 105 via line 186 and computer 184 is connected to data communication network 140 via data connector 188. In operation, an agent in station 180 dials a predetermined telephone number which terminates at network switch 110. Switch 110 then connects this call to station trunk 122. As a result, telephone 182 is connected to network switch 110 until the agent terminates the call. Consequently, the equipment and software in provider call center 102 are available to station 180.

The present invention can also be applied to multiple network call centers. The data communication networks in these network call centers (such as network 140 of FIG. 1) are connected to each other by a high speed data connector. The network switches of these call centers are connected to each other using reserved telephone connections. As a result, telephone calls can be routed from one call center to another without undue delay.

The invention has been described with reference to specific exemplary embodiments thereof Various modification and changes may be made thereunto without departing from the broad spirit and scope of the invention. The specification and drawings are, accordingly, to be regarded in an illustrative rather than a restrictive sense; the invention is limited only by the provided claims.

What is claimed is:

1. A method for establishing two or more remote call centers from a network call center, comprising steps of:

(a) assigning a first set of internal connection points in a first switching apparatus at the network call center to a first set of agents associated with a first remote call center, said connection points characterized in that an agent calling one of the connection points becomes connected at the called internal connection point until the agent intentionally disconnects;

(b) assigning a second set of internal connection points to a second set of agents associated with a second remote call center; and (c) receiving first calls at the network call center meant for the first remote call center and second calls meant for the second call center, and connecting first calls to agents connected at internal connection points assigned to the first call center and second calls to agents connected at internal connection points assigned to the second call center.

2. The method of claim 1 further comprising a step for providing routing services for selecting among the first set of agents for connecting a call for the first call center, and selecting among the second set of agents for connecting a call for the second call center.

3. The method of claim 1 comprising a step for providing outdialing services by the network call center, and connecting answered outdialed calls made for the first remote call center to available agents at the first remote call center, and answered outdialed calls for the second call center to available agents at the second call center.

4. The method of claim 1 comprising a step for compiling statistics on call center activity at the network call center for the first and second remote call centers.

5. The method of claim 1 wherein in step (c) calls for the first remote call center are switched to an automatic call distributor at the first call center and distributed to available agents at the first call center by the automatic call distributor.

6. The method of claim 4 comprising a step for incorporating the statistics compiled in preparing charges to be assessed by the network call center against the first and second remote call centers.

7. A method for providing call center services from a network call center to a first and second remote call center, comprising steps of:

(a) assigning a first set of internal connection points in a first switching apparatus at the network call center to a first set of agents associated with a first remote call center, said connection points characterized in that an agent calling one of the connection points becomes connected at the called internal connection point until the agent intentionally disconnects;

(b) assigning a second set of internal connection points to a second set of agents associated with a second remote call center;

(c) receiving first calls at the first call center meant for the first remote call center and second calls meant for the second call center, and connecting first calls to agents connected at internal connection points assigned to the first call center and second calls to agents connected at internal connection points assigned to the second call center;

(d) compiling statistics on services provided by the network call center to the first and second remote call centers; and (e) charging the first and second remote call centers for the services provided.

8. The method of claim 7 wherein, in step (d), services provided include historical reporting of activity.

9. The method of claim 7 wherein services provided include agent-level routing services.

10. A network call center for providing call center services to first and second remote call centers, comprising:

a switching apparatus connected to an intelligent network by a trunk and having internal connection points characterized in that said internal connection points, when dialed by a remote agent, connect the dialing agent to the switching apparatus until the agent terminates the connection;

a set of servers connected through a (CTI) Server to the switching apparatus, providing call center functions;

wherein a first set of internal connection points is reserved for agents of the first remote call center and a second set of internal connection points are reserved for agents of the second remote call center, and wherein call center services are provided to the first set of agents and the second set of agents with agents connected at the respective internal connection points.

11. The network call center of claim 10 wherein a different set of call center services is provided to the first and second remote call centers.

12. The network call center of claim 10 wherein the call center services provided comprise routing services, statistical monitoring and modeling; client data storage and provision, and remote call center activity monitoring and billing.

13. A network call center system comprising:

a switching apparatus connected to an intelligent network by a trunk and having internal connection points characterized in that said internal connection points, when dialed by a remote agent, connect the dialing agent to the switching apparatus until the agent terminates the connection;

a set of servers connected through a (CTI) Server to the switching apparatus, providing call center functions;

a first remote call center having a set of first local agents equipped each with a telephone and line access to the network call center; and a second remote call center having a set of second local agents equipped each with a telephone and line access to the network call center;

wherein a first set of internal connection points is reserved for the first set of local agents and a second set of internal connection points are reserved for the second set of local agents, and wherein call center services are provided to the first set of local agents and the second set of local agents with agents connected at the respective internal connection points.

14. The network call center system of claim 13 wherein a different set of call center services is provided to the first and second set of local agents.

15. The network call center system of claim 13 wherein the call center services provided comprise routing services, statistical monitoring and modeling; client data storage and provision, and remote call center activity monitoring and billing.

* * * * *